(12) United States Patent
Braunheim et al.

(10) Patent No.: US 12,364,941 B2
(45) Date of Patent: Jul. 22, 2025

(54) FUEL FILTER

(71) Applicant: MAHLE International GmbH, Stuttgart (DE)

(72) Inventors: Michael Braunheim, Goeppingen (DE); Andreas Kollmann, Eitweg (AT); Patrick Wieler, Schorndorf (DE)

(73) Assignee: Mahle International GmbH (DE)

( * ) Notice: Subject to any disclaimer, the term of this patent is extended or adjusted under 35 U.S.C. 154(b) by 0 days.

(21) Appl. No.: 18/435,990

(22) Filed: Feb. 7, 2024

(65) Prior Publication Data

US 2024/0350949 A1    Oct. 24, 2024

Related U.S. Application Data

(62) Division of application No. 17/422,175, filed as application No. PCT/EP2020/050450 on Jan. 9, 2020, now Pat. No. 12,145,090.

(30) Foreign Application Priority Data

Jan. 10, 2019 (DE) .................... 10 2019 200 233.1
Mar. 21, 2019 (DE) .................... 10 2019 203 875.1

(51) Int. Cl.
*B01D 35/30* (2006.01)
*B01D 29/15* (2006.01)
(Continued)

(52) U.S. Cl.
CPC ............. *B01D 35/30* (2013.01); *B01D 29/15* (2013.01); *B01D 35/005* (2013.01);
(Continued)

(58) Field of Classification Search
CPC ...... B01D 35/30; B01D 29/15; B01D 35/005; B01D 36/001; B01D 36/003;
(Continued)

(56) References Cited

U.S. PATENT DOCUMENTS 9,186,602 B2    11/2015  Rathod et al.
10,399,020 B2    9/2019  Weindorf et al.
(Continued)

FOREIGN PATENT DOCUMENTS

DE    19519352 A1    11/1996
DE    19538883 A1    4/1997
(Continued)

OTHER PUBLICATIONS

English abstract for DE-102013008987.
English abstract for DE-19519352.
English abstract for DE-19538883.

*Primary Examiner* — Waqaas Ali
(74) *Attorney, Agent, or Firm* — Fishman Stewart PLLC

(57) ABSTRACT

A fuel filter for an internal combustion engine may include a filter housing, a ring filter element arranged in the filter housing, a function carrier engaging in an interior space of the ring filter element, a water collection space arranged below the ring filter element, a first venting part channel, and a second venting part channel. The function carrier may include a clean channel extending therein. The first venting part channel may extend from the water collection space through the function carrier and may be communicatingly connected to an air discharge channel extending in the function carrier. The second venting part channel may extend through an upper end disc of the ring filter element and may be communicatingly connected to the air discharge channel.

20 Claims, 4 Drawing Sheets

(51) Int. Cl.
*B01D 35/00* (2006.01)
*B01D 36/00* (2006.01)
*F02M 37/24* (2019.01)
*F02M 37/34* (2019.01)

(52) U.S. Cl.
CPC ......... *B01D 36/001* (2013.01); *B01D 36/003* (2013.01); *F02M 37/24* (2019.01); *F02M 37/34* (2019.01); *B01D 2201/291* (2013.01); *B01D 2201/301* (2013.01); *B01D 2201/347* (2013.01)

(58) Field of Classification Search
CPC ........ B01D 2201/291; B01D 2201/301; B01D 2201/347; F02M 37/24; F02M 37/34
See application file for complete search history.

(56) References Cited

U.S. PATENT DOCUMENTS

| | | | |
|---|---|---|---|
| 2006/0180541 A1* | 8/2006 | Hueppchen | B01D 35/0273 |
| | | | 210/493.1 |
| 2008/0116126 A1 | 5/2008 | Greiving et al. | |
| 2008/0164188 A1 | 7/2008 | Jensen et al. | |
| 2009/0114578 A1* | 5/2009 | Pekarsky | B01D 35/147 |
| | | | 210/123 |
| 2009/0230063 A1* | 9/2009 | Hawkins | B01D 35/147 |
| | | | 210/348 |
| 2010/0257824 A1* | 10/2010 | Wilkendorf | B01D 35/153 |
| | | | 55/312 |
| 2018/0290086 A1 | 10/2018 | Grisham et al. | |

FOREIGN PATENT DOCUMENTS

| | | |
|---|---|---|
| DE | 202006017614 U1 | 4/2008 |
| DE | 112013001171 T5 | 11/2014 |
| DE | 102013008987 A1 | 12/2014 |
| DE | 102016000340 A1 | 7/2017 |
| EP | 1935468 A1 | 6/2008 |
| WO | 15176791 A1 | 11/2015 |

* cited by examiner

FUEL FILTER

CROSS-REFERENCE TO RELATED APPLICATIONS

This application is a divisional application of and claims priority to U.S. Patent Application No. U.S. Ser. No. 17/422,175, filed on Jul. 10, 2021, which claims priority to International Patent Application No. PCT/EP2020/050450, filed on Jan. 9, 2020, German Patent Application No. DE 10 2019 200 233.1, filed on Jan. 10, 2019, and German Patent Application No. DE 10 2019 203 875.1, filed on Mar. 21, 2019, the contents of all of which are hereby incorporated by reference in their entirety.

TECHNICAL FIELD

The present invention relates to a fuel filter for an internal combustion engine, having a ring filter element, which is arranged in a filter housing. Furthermore, the invention relates to a ring filter element for such a fuel filter.

BACKGROUND

Fuel filters for internal combustion engines have to be continuously vented for a perfect operation in order to prevent that air bubbles in a fuel pump connected downstream can lead to cavitation. In addition it is necessary with each cold start that an air cushion present in the fuel filter is first compressed. The greater the air cushion is when doing so, the longer will it take before the internal combustion engine starts firing. The air volume present in the fuel filter should therefore be kept as small as possible.

In WO 2015/176791 A1, a filter device for filtering fluids with an equalization tube is shown, wherein between an upper end cap and a screw cover an air cushion region is formed, it reached the equalization tube does not project.

From DE 195 38 883 A1 a filter for liquids is known, wherein a venting tube with a laterally arranged venting bore is provided, wherein the venting bore is closed by a float with rising liquid level. At the moment of a closure of the venting ball by the float, an air cushion is present above and below the closed venting bore.

Disadvantageous in the known prior art is on the one hand that the air cushion that is present in the fuel filter comprises a relatively large air volume.

Disadvantageous with the fuel filters known from the prior art is on the other hand that a venting channel often runs in a filter housing of the fuel filter where it can only be formed comparatively elaborately, since the housings of fuel filters are often formed as castings.

SUMMARY

The present invention is based on the object of stating for a fuel filter of the generic type or for a ring filter element an improved or at least an alternative embodiment which in particular overcomes the disadvantages known from the prior art. Preferentially, the air volume of the air cushion is to be reduced. Additionally or alternatively, the realisability of the filter housing is to be simplified in order to reduce the manufacturing costs.

According to the invention, this problem is solved through the subject matter of the independent claim(s). Advantageous embodiments are the subject mater of the dependent claim(s).

According to a first independent solution, the present invention is based on the general idea of reducing the distance between a filter housing cover of the fuel filter and a venting device. With fuel the filter installed upright, i.e. with substantially vertical longitudinal centre axis of the fuel filter, the air preferably collects in the filter housing cover above the venting device. By reducing the distance between filter housing cover and venting device, the space volume that is available for forming the undesirable air volume can be reduced. As a consequence, the air volume also decreases.

The fuel filter for an internal combustion engine according to the invention comprises a filter housing and a filter housing cover, wherein the filter housing cover can be detachably connected to the filter housing. For such a detachable connection between the filter housing cover and the filter housing it can be provided that the filter housing cover has an external thread at least in sections and that the filter housing has an internal thread at least in sections, wherein the internal thread can be designed substantially complimentarily to the external thread. Here it is also conceivable that in the region of the external thread and/or of the internal thread a circumferential recess and/or clearance is provided, into which the ceiling element can be inserted. Such a ceiling element can be for example an O-ring.

The filter housing cover and the filter housing delimit a filter space in which a ring filter element is arranged. The ring filter element divides the filter space into a raw side and a clean side. The ring filter element can be formed hollow-cylindrically, wherein the ring filter element can comprise a hollow-cylindrical filter body which can be designed for filtering fluids such as fuels, in particular diesel fuels. A fluid, which flows into the raw side of the filter, can leave the fuel filter only when it flows through the ring filter element, in particular the filter body of the ring filter element, and thus flows into the clean side. Here, the fluid to be filtered can flow through the ring filter element substantially in the radial direction from the raw side to the clean side. Here, the radial direction can be defined transversely to a longitudinal extension direction of the ring filter element. The longitudinal direction extension of the ring filter element can coincide with an axial direction of the fuel filter and/or be oriented parallel to such an axial direction of the fuel filter.

The filter housing cover comprises a head portion and a foot portion, which are arranged offset relative to one another along an axial direction. The axial direction can coincide with a longitudinal extension direction of the fuel filter.

In the foot portion, the filter housing cover comprises at least one foot inner diameter transversely to the axial direction, which corresponds at least to an outer diameter of the ring filter element. The outer diameter of the ring filter element can be defined transversely to the longitudinal extension of the ring filter element and/or transversely to the axial direction. Thus, the foot portion of the filter housing cover can receive and/or delimit at least a part section of the ring filter element. The foot inner diameter of the foot portion can vary along the axial direction linearly at least in section and/or non-linearly at least in sections. It is also conceivable that the foot inner diameter of the foot portion is substantially constant along the axial direction.

In the head portion, the filter housing cover has at least one head inner diameter transversely to the axial direction that is smaller than the foot inner diameter. At the start of the head portion viewed along the axial direction it can thereby be defined that the head inner diameter is smaller than the outer diameter of the ring filter element. The head inner diameter of the head portion can vary along the axial direction linearly at least in sections and/or non-linearly at least in sections, wherein it is also conceivable that the head inner diameter of the head portion is substantially constant along the axial direction at least in sections. The head inner diameter of the head portion can decrease and/or become smaller along the axial direction with increasing axial distance from the foot portion at least in sections linearly and/or non-linearly at least in sections. A start of the head portion along the axial direction can be defined from a head inner diameter that is smaller than the outer diameter of the ring filter element, so that a filter body of the ring filter element cannot project into the head portion.

It can be provided that the space volume, delimited by the head portion of the filter housing cover, is smaller than the space volume delimited by the foot portion of the filter housing cover.

The ring filter element forms a venting device which is arranged in the head portion at least in sections and in the foot portion at least in sections, wherein the venting device forms at least one venting channel which with a first end leads into the head portion. Thus the venting channel can be fluidically connected via the first end to the head portion or the space volume delimited by the head portion. The venting device enables a continuous venting of the fuel filter, in particular a venting of the filter space and/or of the raw side. The air volume or the air cushion, which is formed between the first end of the venting channel and the wall of the filter housing cover, is reduced in that the head portion has a smaller head inner diameter than the foot inner diameter. Accordingly, despite a tolerance-induced distance seen in the axial direction between the first end of the venting channel and the wall of the filter housing cover, in particular of the wall of the body portion, the existing air volume or the air cushion can be minimised.

On starting or switching-on the internal combustion engine, this air volume or this air cushion, which is located and/or forms in the upper region of the filter space, is compressed and returned via the venting channel, which can be fluidically connected to an air discharge channel, into a fuel tank or a fuel reservoir. Because of the reduced air volume or air cushion in the filter space, in particular in the filter housing cover, the internal combustion engine starts in a shorter time since a smaller air volume has to be compressed until a necessary operating pressure is attained in the fuel system of the internal combustion engine.

Below the ring filter element, a water collection space for collecting water separated out of the fuel can be arranged.

An advantageous further development of the solution according to the invention it can be provided that the filter housing cover comprises a shoulder portion which is arranged along the axial direction between foot portion and the head portion, wherein the filter housing cover in the shoulder portion has at least one shoulder inner diameter transversely to the axial direction that is smaller than the foot inner diameter and larger than the head inner diameter.

Seen along the axial direction, the start of the shoulder portion can be defined in that the shoulder inner diameter is smaller than the outer diameter of the ring filter element. The shoulder inner diameter of the shoulder portion can vary along the axial direction linearly at least in sections and/or non-linearly at least in sections, wherein it is also conceivable that the shoulder inner diameter of the shoulder portion is substantially constant along the axial direction at least in sections. With increasing axial distance from the foot portion, the shoulder inner diameter of the shoulder portion can decrease and/or get smaller linearly at least in sections and/or non-linearly at least in sections.

The ventilation device is arranged in the head portion at least in sections, in the foot portion at least in sections and in the shoulder portion at least in sections. In particular, the venting channel can be arranged in the head portion at least in sections, in the foot portion at least in sections, and in the shoulder portion at least in sections.

By way of the shoulder portion, a substantially steady and, in terms of production, advantageous transition between the foot portion and the head portion can be formed.

In a further advantageous embodiment of the solution according to the invention it is provided that the head inner diameter is smaller than 60% of the foot inner diameter, in particular smaller than 40% of the foot inner diameter. Advantageous in this is that the space volume, delimited by the head portion and in which the air volume or air cushion can form makes possible, in the tense relationship of tolerance conditions and preferably small air volumes, a substantially optimal configuration of the fuel filter with regard to the starting time of the internal combustion engines.

Further, it can be provided that the head portion along the axial direction has a shorter longitudinal extension than the foot portion. Here it can be provided that the head portion has a longitudinal extension that is at least smaller than 50% of the longitudinal extension of the foot portion, in particular which is at least smaller than 30% of the longitudinal extension of the foot portion.

Further it can be provided that the shoulder portion along the axial direction has a shorter longitudinal extension than the foot portion. Here it can be provided that the shoulder portion has a longitudinal extension that is at least smaller than 50% of the longitudinal extension of the foot portion, in particular which is at least smaller than 30% of the longitudinal extension of the foot portion.

In an advantageous further development of the solution according to the invention it is provided that the head portion, the foot portion, the venting channel and the first end of the venting channel are oriented coaxially and/or concentrically to one another and parallel to the axial direction. By way of this, a preferably rotation-symmetrical configuration of the fuel filter, in particular of the filter housing cover and of the ring filter element can be achieved.

In a further advantageous embodiment of the solution according to the invention it is provided that a function carrier is arranged in the fuel filter housing which engages in the clean side of the ring filter element. Further, an air discharge channel arranged in the fuel filter which extends in the function carrier at least in sections, wherein the venting channel is fluidically communicatingly connected to the air discharge channel. The air discharge channel can be fluidically connected to a fuel tank or a fuel reservoir. The function carrier can be formed as a plastic injection moulded part and thereby be manufactured cost-effectively and in a high quality.

In an advantageous further development of the solution according to the invention it is provided that the first end of the venting channel forms a choke section. This choke section can be formed in that the venting channel has a smaller channel cross section in the choke section and forms a choke. The choke section makes possible a separation between the raw side and the clean side.

In a further advantageous embodiment of the solution according to the invention it is provided that the venting device comprises a channel cylinder with a cylinder outer diameter which delimits the venting channel, wherein the venting device comprises a stepped ring portion, which has a ring outer diameter that is larger than the cylinder outer diameter, wherein the channel cylinder has longer longitudinal extension along the axial direction than the stepped ring portion, wherein the channel cylinder penetrates the stepped ring portion at least in sections.

It can be provided that the stepped ring portion is substantially arranged in the shoulder portion, whereas the channel cylinder can be arranged in the head portion at least in sections, in the shoulder portion at least in sections, and the foot portion at least in sections.

It can be provided that the stepped ring portion, the channel cylinder, the head portion, the foot portion, the venting channel and the first end of the venting channel and/or the choke section are oriented coaxially and/or concentrically to one another and parallel to the axial direction.

In an advantageous further development of the solution according to the invention it is provided that the channel cylinder is formed in one piece with the stepped ring portion. The channel cylinder and the stepped ring portion can be formed in one piece as plastic injection moulding and thus make possible a high-quality yet cost-effective manufacture.

In a further advantageous embodiment of the solution according to the invention it is provided that the ring filter element comprises at least one end disc in order to prevent a flow through the filter body of the ring filter element from the raw side to the clean side along the axial direction. The end disc can have an annular contour with an inner diameter and an outer diameter, wherein the inner diameter can be smaller than the outer diameter. It can be provided that the ring outer diameter of the stepped ring portion corresponds to the inner diameter of the end disc. The end disc can be formed as plastic injection moulding and thus makes possible a high-quality yet cost-effective manufacture.

In an advantageous further development of the solution according to the invention it is provided that the venting device is formed in one piece with at least one end disc. The venting device and the end disc can be formed in one piece as plastic injection moulding and thus make possible a high-quality yet cost-effective manufacture. It can be provided that the ring outer diameter of the stepped ring portion corresponds to the inner diameter of the end disc.

Furthermore the invention relates to a ring filter element for a fuel filter according to the invention, wherein the ring filter element comprises an annular and/or cylindrical filter body. The filter body can comprise or be formed of a filter material that is for example pleated, i.e. folded, preferentially in a stellate fold.

Furthermore, the ring filter element comprises a venting device which comprises at least one venting channel with a first end, which axially protrudes over the filter body.

In particular, the ring filter element and the housing of the fuel filter are matched to one another so that in an installed position of the ring filter element in the fuel filter the first end of the venting channel leads into the head portion of the fuel filter. In other words, the venting channel protrudes axially over the filter body so far that its first end leads into the head portion of the filter housing cover.

Additionally or alternatively it can be provided that the venting channel is arranged coaxially to the filter body and fluidically connects an inner side of the filter body enclosed by the filter body in the circumferential direction with an outer side of the filter body.

Additionally or alternatively it can be provided that the venting channel axially penetrates an end disc of the ring filter element axially delimiting the filter body.

In an advantageous further development of the solution according to the invention it is provided that the first end of the venting channel forms a choke section. This choke section can be formed in that the venting channel has a smaller channel cross section in the choke section and forms a choke. The choke section makes possible in the installed position of the ring filter element in the fuel filter according to the invention a separation between the raw side and the clean side.

In a further advantageous embodiment of the solution according to the invention it is provided that the venting device comprises a channel cylinder with a cylinder outer diameter which delimits the venting channel. Furthermore, the venting device comprises a stepped ring portion which has a ring outer diameter that is larger than the cylinder outer diameter. The channel cylinder has a longer longitudinal extension along the axial direction than the stepped ring portion, wherein the channel cylinder penetrates the stepped ring portion at least in sections.

It can be provided that the stepped ring portion, the channel cylinder, the filter body, the venting channel and the first end of the venting channel and/or the choke section are oriented coaxially and/or concentrically to one another and parallel to the axial direction.

In an advantageous further development of the solution according to the invention it is provided that the channel cylinder is formed in one piece with a stepped ring portion. The channel cylinder and the stepped ring portion can be formed in one piece as plastic injection moulding and thus make possible a high-quality yet cost-effective manufacture.

In a further advantageous embodiment of the solution according to the invention it is provided that at least one end disc is arranged on the filter body. The end disc can have an annular contour with an inner diameter and an outer diameter wherein the inner diameter can be smaller than the outer diameter. It can be provided that the ring outer diameter of the stepped ring portion corresponds to the inner diameter of the end disc. The end disc can be formed as a plastic injection moulding and thus makes possible a high-quality yet cost-effective manufacture.

In an advantageous further development of the solution according to the invention it is provided that the venting device is formed in one piece with at least one end disc. The venting device and the end disc can be formed in one piece as plastic injection moulding and thus make possible a high-quality yet cost-effective manufacture. It can be provided that the ring outer diameter of the stepped ring portion corresponds to the inner diameter of the end disc.

According to a second independent solution, the present invention is based on the general idea of routing a venting channel for venting a fuel filter not, as usual to date, in a filter housing of the fuel filter but in a function carrier which, in the installed state, engages in an interior space of a ring filter element arranged in the filter housing. By routing the venting channel or the venting channels in the function carrier, which can usually be formed as plastic injection moulding and thus manufactured cost-effectively yet in a high quality, the manufacture and the processing of the filter housing in particular becomes significantly simpler and thus more cost-effective. Here, the fuel filter according to the invention has the previously described filter housing, in which a ring filter element that is flowed through in the radial direction from a raw side to a clean side is arranged. Here, the function carrier engages in the interior space of the ring filter element and accommodates a clean channel via which cleaned fuel can be discharged in particular to an internal combustion engine. Below the ring filter element, a water collection space for collecting water separated out of the fuel is arranged. According to the invention, a first venting part channel is now provided, which from the water collection space runs through the function carrier and is communicatingly connected to an air discharge channel running in the function carrier. Additionally a second venting part channel is provided, which runs through an upper end disc of the ring filter element, is connected to a filter space and is likewise communicatingly connected to the air discharge channel.

Optionally, a first choke can be provided between the first venting part channel and the air discharge channel, which in particular makes possible a separation between the raw side and the clean side. The second venting part channel usually starts shortly below a central dome of a filter housing cover in which during the operation only air is usually present. With the fuel filter according to the invention it is not only that a simple design and cost-effective manufacture of the filter housing is possible but also an improved venting of the fuel filter, namely builds out of the filter space, in particular out of the raw side, and also out of the water collection space. Here, the air discharge channel can be connected to a fuel tank. Producing the air discharge channel and of the first venting part channel in the function carrier is easily and cost-effective possible in terms of manufacture for example as plastic injection moulding.

In an advantageous further development of the solution according to the invention, a second choke is present between the second venting part channel and the air discharge channel. This embodiment represents a version which makes possible an even further improved protection with respect to a separation between raw side and clean side. By way of the first choke, exclusively air is thus preferentially conducted out of the water collection space into the air discharge channel, while through the second choke, exclusively air is preferentially conducted out of the filter space, for example the raw side, into the air discharge channel.

In an advantageous further development of the solution according to the invention, the second venting part channel, the first choke and the second choke are formed in one piece, with the upper end disc of the ring filter element. By way of this it is possible to form the mentioned components, i.e. the second venting part channel and the two chokes, in a high-quality yet cost-effective manner, in particular when these, together with the upper end disc of the ring filter element, are formed as one-piece plastic injection moulding.

Practically, the first choke is tightly inserted via a first ring seal, for example an O-ring seal, into the first venting part channel, while the second choke is tightly inserted via a second ring seal into the function carrier. Thus, the first seal seals the first venting part channel against the air discharge channel, while the second seal seals the second venting part channel against the air discharge channel. By way of this special double seal it can be ensured that no raw side/clean side intermixing takes place and because of this an undesirable bypass flow is avoided in particular.

Practically, the first rind seal has a smaller diameter than the second ring seal. In addition, a bevel can be arranged in this case at an end of the first venting part channel facing the air discharge channel which facilitates introducing the first choke or the first ring seal into the first venting part channel. By way of the different diameters of the two ring seals, a simplified introduction and thus a simplified assembly can be achieved.

In a further advantageous embodiment of the solution according to the invention, the first choke is formed as a separate component and tightly inserted in the first venting part channel via a first ring seal. In this case, the first choke can thus be formed independently of the upper end disc and independently of the first and second venting part channel, wherein in this case under certain conditions no second choke has to be provided even at the transition from the second air venting part channel to the air discharge channel, as a restful of which a design simplification could be achieved. Forming the first choke as a separate component also simplifies the construction of a plastic injection mould.

In an advantageous further development of the solution according to the invention, the first venting part channel and the second venting part channel are arranged coaxially to one another. By way of this, a central arrangement in the axis of the ring field element or of the function carrier is possible.

The air discharge channel can be arranged for example parallel to the first venting part channel and in the installed state also parallel to the second venting part channel, as a result of which a space-saving arrangement of the same in the function carrier is possible. In a region about the first venting part channel and the second venting part channel, the air discharge channel can also annularly surround the two venting part channels.

Practically, a perforated lid or a screen is arranged at an inlet of the second venting part channel. By way of this, an undesirable entry of larger dirt particles and the clogging of the choke through dirt accumulations can be avoided.

The two solutions described above are basically independent of one another. However, the two solutions and their embodiments can be combined with one another in any way provided this is technically possible or practical. This applies to both the fuel filter and also to the ring filter element.

Further important features and advantages of the invention are obtained from the subclaims, from the drawings and from the associated figure description by way of the drawings.

It is to be understood that the features mentioned above and still to be explained in the following cannot only be used in the respective combinations stated but also in other combinations or by themselves without leaving the scope of the present invention.

Preferred exemplary embodiments of the invention are shown in the drawings and are explained in more detail in the following description, wherein same reference numbers relate to same or similar or functionally same components.

FIGS. 1 to 3 show the embodiments according to the first solution and FIGS. 4 and 5 show the embodiments according to the second solution.

BRIEF DESCRIPTION OF THE DRAWINGS

It shows, in each case schematically

DETAILED DESCRIPTION

Figure 1:
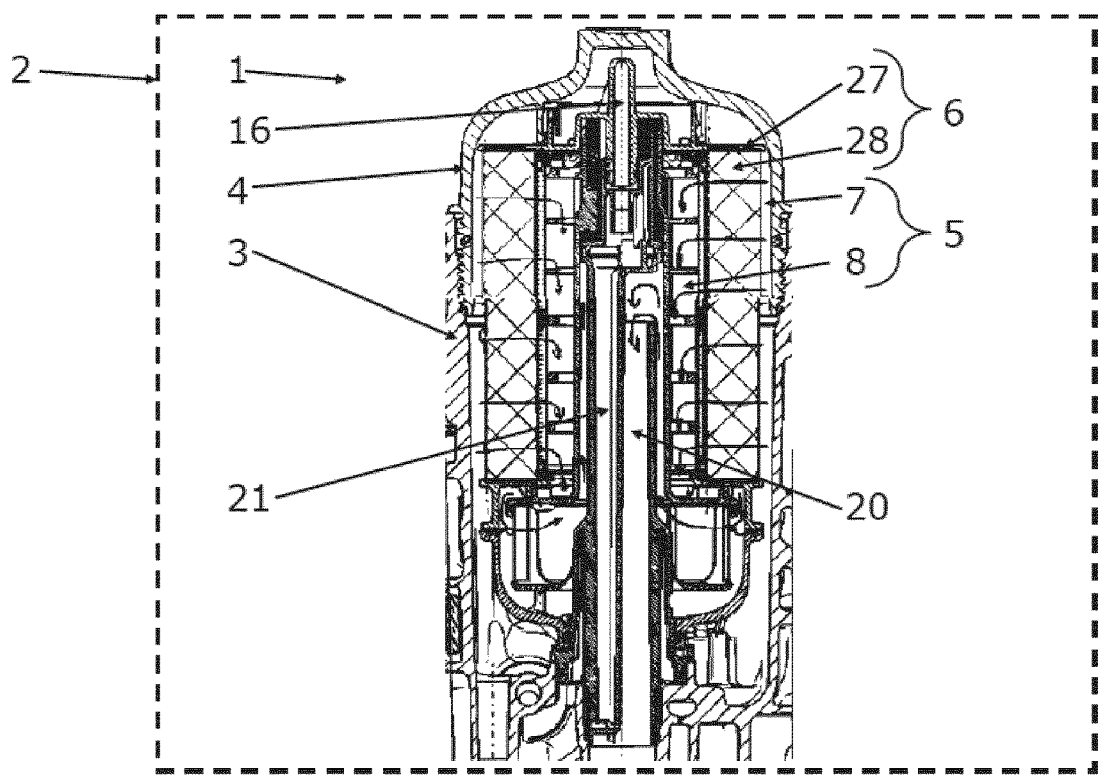
FIG. 1 shows a longitudinal section through a fuel filter according to the invention.

In FIG. 1, a longitudinal section through a fuel filter 1 for an internal combustion engine 2, according to the invention is shown. The fuel filter 1 comprises a filter housing 3 and a filter housing cover 4, which can be detachably connected to one another, wherein in the shown exemplary embodiment the filter housing cover 4 has an external thread, which engages in an internal thread of the filter housing 3.

The filter housing cover 4 and the filter housing 3 delimit, in the connected state, a filter space 5, which is divided by an inserted ring filter element 6 into a raw side 7 and a clean side 8. A fluid, in particular a fuel, flows through the ring filter 6 substantially transversely to an axial direction 11, shown in FIG. 3, from the raw side 7 to the clean side 8 and in the process is substantially freed of contaminations which can result in damaging the internal combustion engines. The ring filter element 6 comprises a cylindrically formed filter body 28 which on an upper face end, comprises an annular end disc 27. An end disc which is not referred to in more detail can also be arranged on the filter body 28 on the lower face end. Practically, the filter body 28 can be formed of a filter material that is pleated, i.e. folded, preferably in a stellate fold.

In the fuel filter 1 a function carrier 20 is arranged, which engages in the clean side 8 of the ring filter element 6 and is employed for discharging the cleaned fluid or fuel from the fuel filter 1. Furthermore, an air discharge channel 21 is arranged in the fuel filter 1 which extends at least partly in the function carrier 20 and is fluidically communicatingly connected to a venting channel 16. The air discharge channel 21 can be fluidically connected to a fuel tank and/or fuel reservoir which is not shown.

Figure 2:
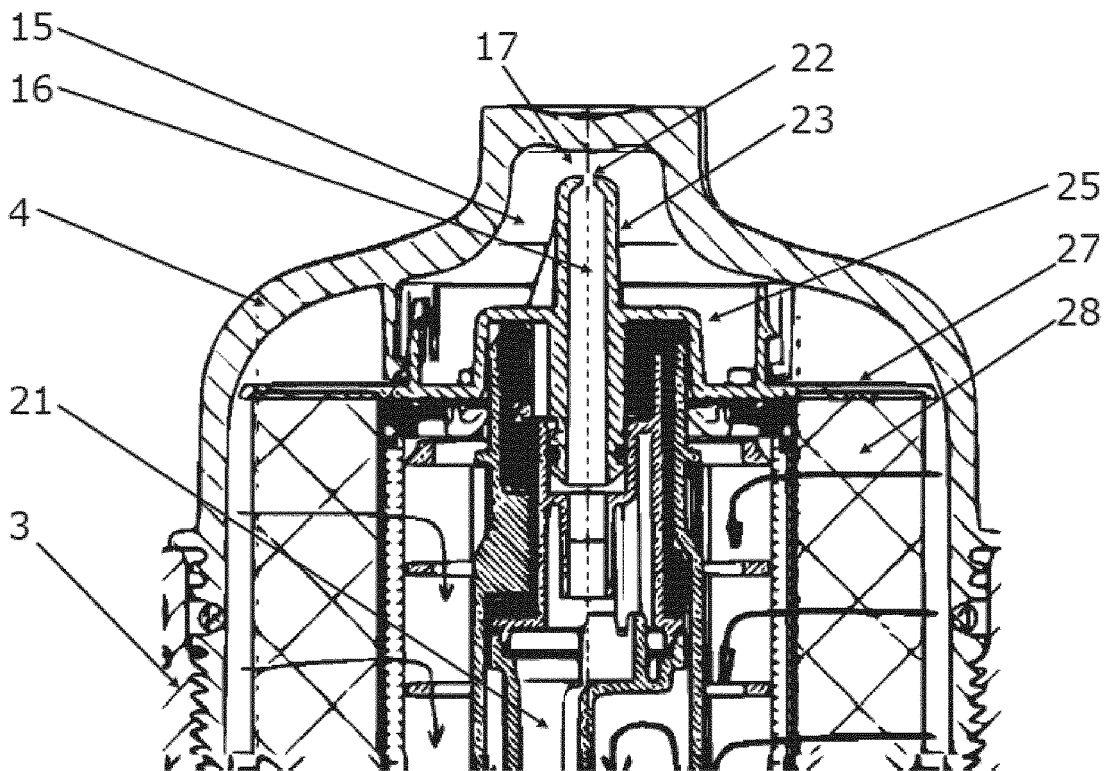
FIG. 2 shows an enlarged extract of FIG. 1.
Figure 3:
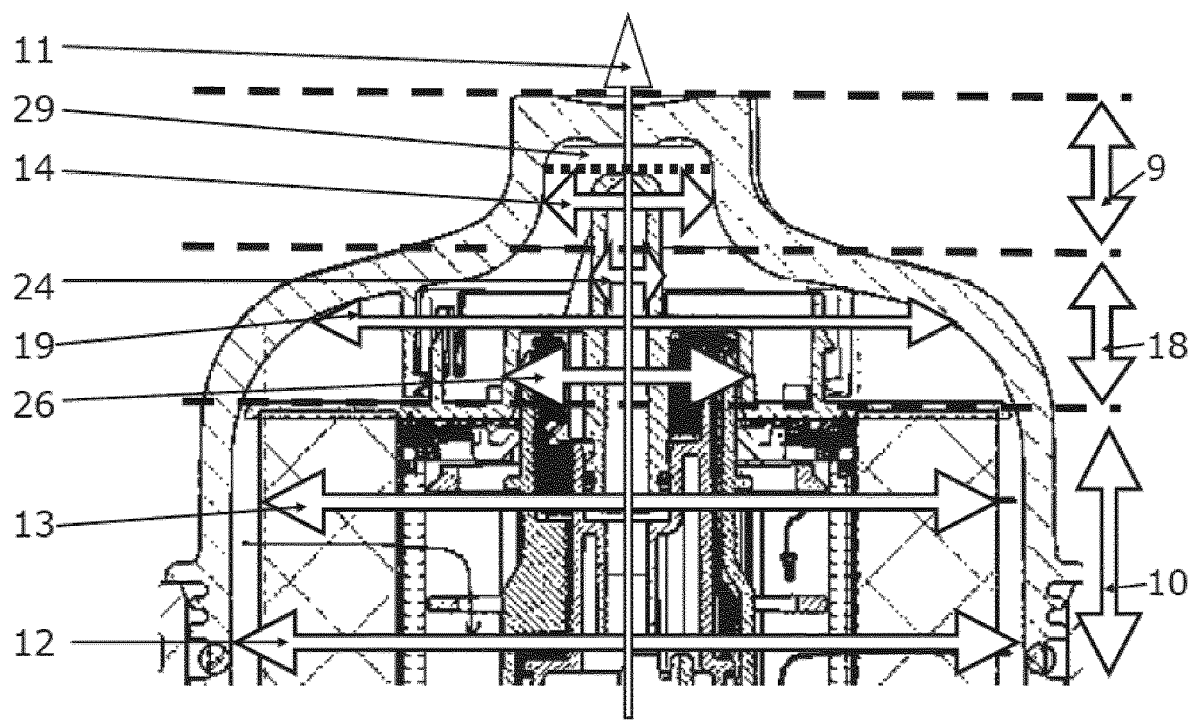
FIG. 3 shows an enlarged further extract of FIG. 1.

Furthermore, the ring filter element 6 comprises a venting device 15 which is shown enlarged in FIG. 2 and FIG. 3. The venting device 15 comprises a channel cylinder 23 with a cylinder outer diameter 24, wherein the channel cylinder 23 delimits the venting channel 16. Furthermore the venting device 15 comprises a stepped ring portion 25, which has a ring outer diameter 26 that is larger than the cylinder outer diameter 24 of the channel cylinder 23.

The channel cylinder 23 has a longer longitudinal extension along the axial direction 11 than the stepped ring portion 25, wherein the channel cylinder 23 penetrates the stepped ring portion 25 at least in sections.

The filter housing cover 4 comprises a head portion 9 and a foot portion 10 which are arranged offset relative to one another along an axial direction 11. In FIG. 3, the longitudinal extension of the respective portion along the axial direction 11 is symbolised in each case, wherein it is noticeable that the respective portion is formed by a wall or a wall portion of the filter housing cover 4. The wall or the wall portion of the filter housing cover 4 can have a substantially constant material thickness. The dashed lines drawn in transversely to the axial direction 11 symbolise the start or the end of a portion of the filter housing cover 4 along the axial direction 11.

In the foot portion 10, the filter housing cover 4 comprises at least one foot inner diameter 12 transversely to the axial direction 11, which at least corresponds to an outer diameter 13 of the ring filter element 6. In the head portion 9, the filter housing cover 4 has at least one head inner diameter 14 transversely to the axial direction 11 that is smaller than the foot inner diameter 12.

The venting device 15 of the ring filter element 6 is arranged in the head portion 9 at least in sections and in the foot portion 10 at least in sections. The venting device 15 forms at least one venting channel 16 which with a first end 17 leads into the head portion 9. By way of this first end 17, the venting channel 16 is fluidically connected to the space volume, which is delimited by the head portion 9. Between the end 17 of the venting device 15, and the inner wall of the filter housing cover 4, within the head portion 9, an air volume 29 or an air cushion 29 is formed, the lower end of which is symbolised along the axial direction 11, in FIG. 3 by a dotted line. Through the configuration of the ring filter element 6, the venting device 15 and the filter housing cover 4 according to the invention, the air volume 29 or the air cushion 29 has a minimum space volume, so that a starting or switching-on of the internal combustion engines 2 can take place within a shorter time since a smaller volume 29 or air cushion 29 has to be compressed in order to attain the operating pressure in the fuel system of the internal combustion engines.

The filter housing cover 4 comprises a shoulder portion 18 which is arranged along the axial direction 11 between the foot portion 10 and the head portion 9, wherein the filter housing cover 4 in the shoulder portion 18, has at least one shoulder inner diameter 19 transversely to the axial direction 11 that is smaller than the foot inner diameter 12 and larger than the head inner diameter 14.

The venting device 15 is thus arranged in the head portion 9 at least in sections, in the foot portion 10 at least in sections and in the shoulder portion 18 at least in sections.

The first end 17 of the venting channel 16 forms a choke section 22. This choke section can be formed in that the venting channel 16 has a smaller channel cross section in the choke section 22 and forms a choke. The choke section 22 makes possible a separation between the raw side 7 and the clean side 8. In order to minimise the space volume of the air cushion 29 or of the air volume 29, the distance along the axial direction 11 between the choke section 22 and the inner wall of the head portion 9 of the filter housing cover 4 has to be minimised.

The head portion 9, the foot portion 10, the venting channel 16, the first end 17 of the venting channel 16 and the choke section 22 are oriented coaxially and/or concentrically to one another and parallel to the axial direction 11.

Figure 4:
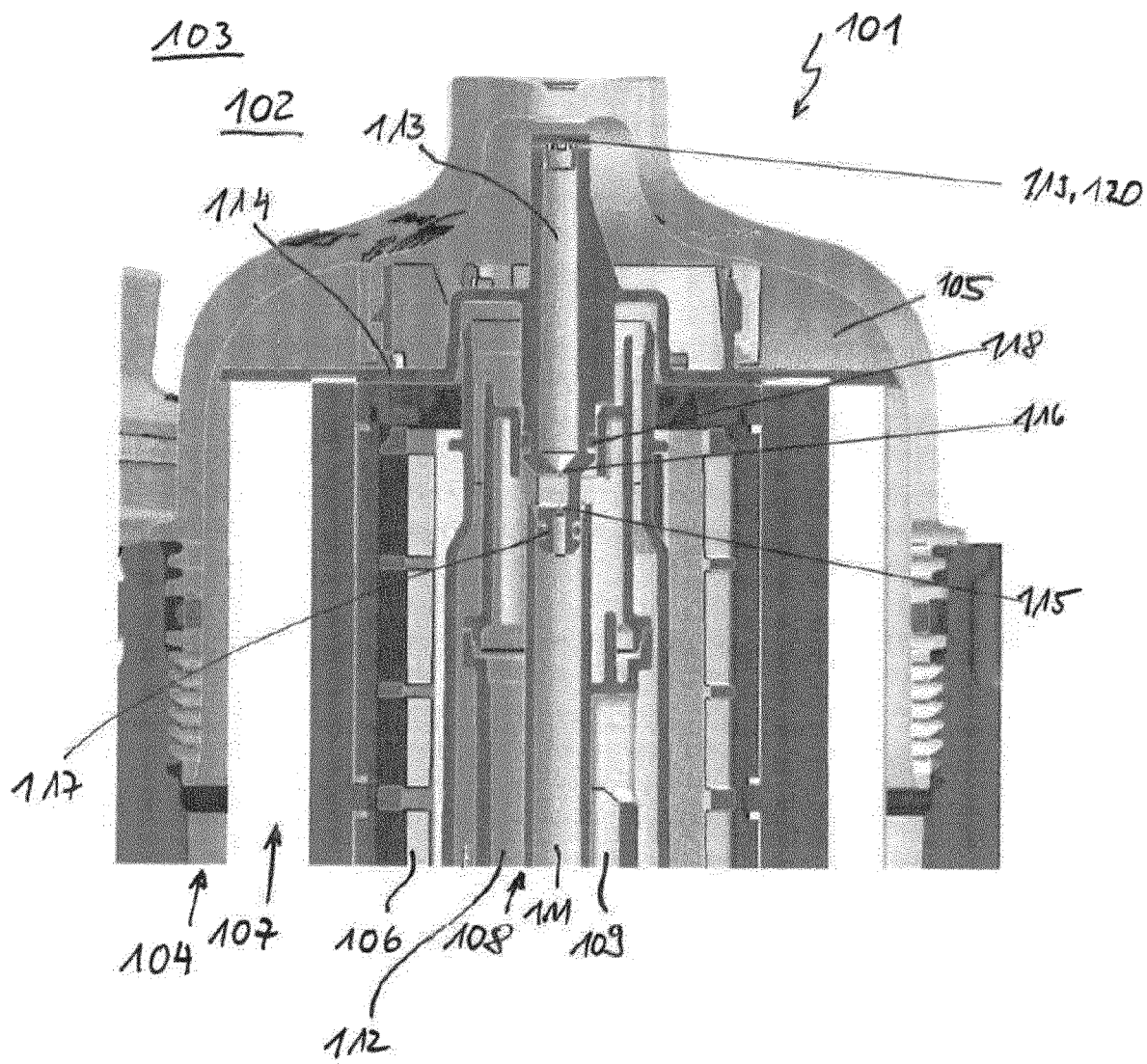
FIG. 4 shows a sectional representation through a fuel filter according to the invention.
Figure 5:
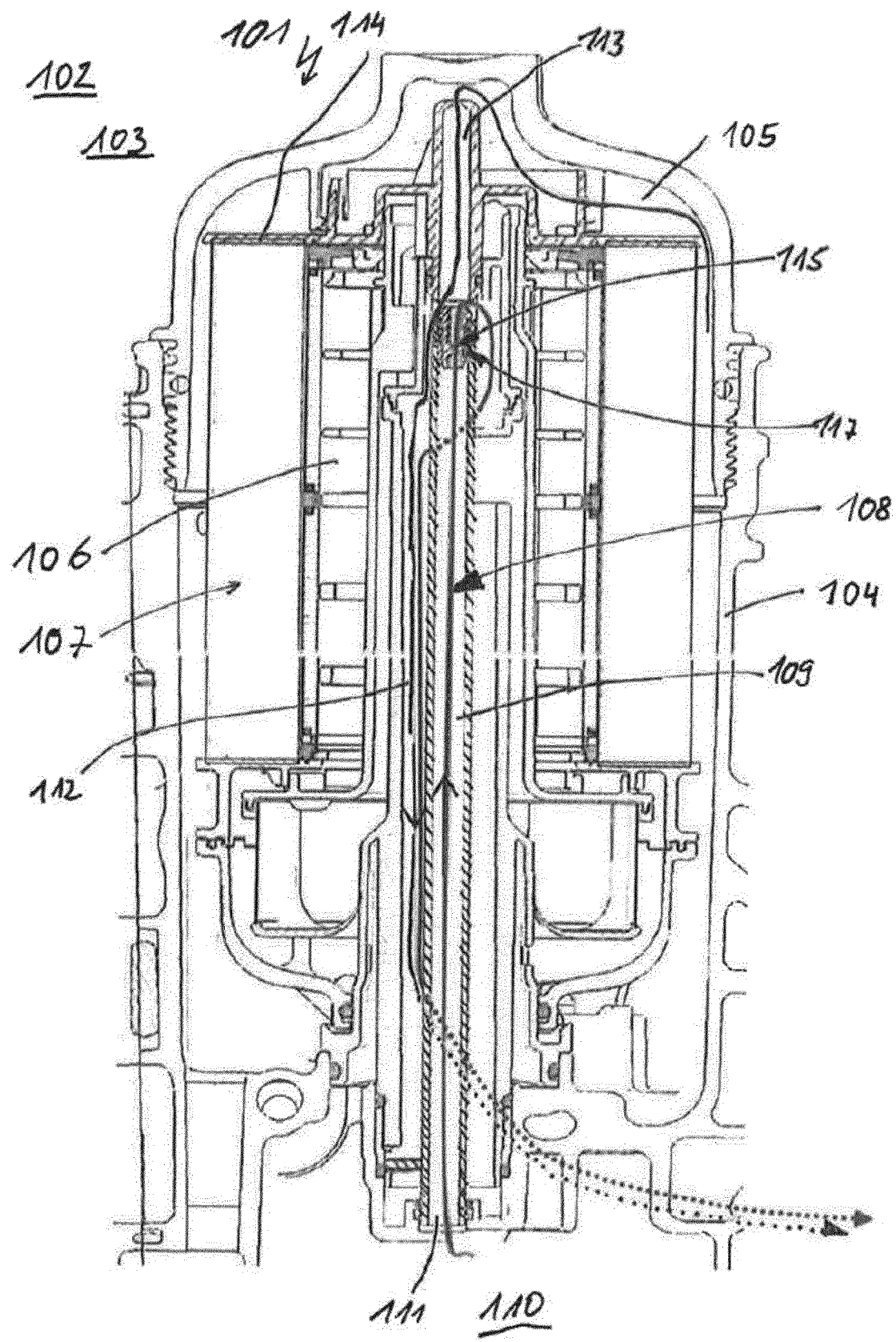
FIG. 5 shows a sectional representation as in FIG. 4, however with another embodiment.

According to the FIGS. 4 and 5, a fuel filter 101 according to the invention for an internal combustion engine 102 which is not shown of a motor vehicle 103 comprises a ring filter element 107 that is arranged in a filter housing 104 and flowed through in the radial direction from a raw side 105 to a clean side 106. Additionally provided is a function carrier 108 which engages in an interior space of the ring filter element 107 and in which a clean channel 109 runs. Below the ring filter element 107 a water collection space 110 is arranged, which for the sake of clarity is merely shown in FIG. 5. According to the invention, a first venting part channel 111 is now provided, which runs from the water collection space 110 through the function carrier 108 and is communicatingly connected to an air discharge channel 112 running in the function carrier 108. Additionally provided is a second venting part channel 113 which runs through an upper end disc 114 of the ring filter element 107 and is likewise communicatingly connected to the air discharge channel 112. Between the first venting part channel 111 and the air discharge channel 112 a first choke 115 is provided according to the invention (see FIGS. 4 and 5). Viewing the embodiment shown according to FIG. 4 it is noticeable that a second choke 116 is provided there between the second venting part channel 113 and the air discharge channel 112. In this case, the second venting part channel 113, the first choke 115, the second choke 116 and the upper end disc 114 are formed in one piece. This offers the major advantage that all previously mentioned components 113, 114, 115 and 116 are produced in a single and common plastic injection moulding operation and because of this can be produced in a high quality and cost-effectively at the same time.

At an inlet of the second venting part channel 113, a perforated cover 119 or a screen 120 can be arranged which prevents an undesirable transfer of dirt particles form the raw side 105 into the second venting part channel 113 and thus into the air discharge channel 112. By way of the perforated cover 119 or screen 120, a transfer of fuel can be additionally at least minimised.

The first choke 115 is tightly inserted via a first ring seal 117 into the first venting part channel 111, while the second choke 116 is tightly inserted via a second ring seal 118 into the function carrier 108. Here, the first ring seal 117 has a smaller diameter than the second ring seal 118, as a result of which an improved and simplified insertion into the first venting part channel 111 and the function carrier 108 materialises.

Viewing the version of the fuel filter 101 according to the invention shown according to FIG. 5 it is noticeable there that the first choke 115 is formed as a separate component and tightly inserted via a first ring seal 117 into the first venting part channel 111. This offers the major advantage that the first choke 115 can be produced separately from the function carrier 108 and also separately from the first venting part channel 111 and compared with FIG. 4 also separately from the second venting part channel 113. The assembly of the first choke 115 on or in the first venting part channel 111 proves to be particularly easy by way of a mere insertion.

Viewing the fuel filter 101 according to the invention in accordance with FIG. 5 further it is noticeable that in this case no second choke 116 at all is provided in the region of the second venting part channel 113, as a result of which a constructive advantage through a simplification can be achieved.

Looking at FIGS. 4 and 5 further it is noticeable that the air discharge channel 112 is arranged parallel to the first venting part channel 111 and that the two venting part channels 111, 113 are arranged coaxially to one another. In this case, the two chokes 115 and 116 according to FIG. 4 are also arranged coaxially to one another.

With the fuel filter 101 according to the invention it is possible for the first time to integrate the chokes 115, 116 necessary for the venting into the ring filter element 107. Should the venting function be disturbed through the clogging of the chokes 115, 116 by particles despite all precautions, the functionality can be remedied by simply replacing the service component ring filter element 107. The difficult working and elaborate quality assurance for the separate venting line out of the water collection space 110 and in particular for the choke that is then required, which was arranged in the past in the filter housing 104, which is formed as a cast housing, is now no longer required so that only a common air discharge channel 112 has to be provided in the function carrier 108 which conducts the separated air back into a fuel tank. The version of the fuel filter 101 according to the invention shown according to FIG. 4 is particularly preferred, in the case of which the ring filter element 107, at its upper end disc 114, comprises a connector (second venting part channel 113) directed to the inside, which contains the second choke 116 and at the same time has an extension downwards on which the first choke 115 is arranged, which is inserted in the first venting part channel 111. By way of the two ring seals, 117, 118 it can be ensured that no raw side/clean side intermixing occurs and a comparatively simple assembly is made possible at the same time.

However it is of particular advantage that the venting channel provided in the filter housing 104 in the past can be entirely omitted and is moved into the function carrier 108.

The invention claimed is:

1. A fuel filter for an internal combustion engine, comprising:
   a filter housing;
   a ring filter element arranged in the filter housing and through which a fluid is flowable in a radial direction from a raw side to a clean side;
   a function carrier disposed at least partially in an interior space of the ring filter element and including a clean channel extending therein;
   a water collection space arranged below the ring filter element;
   a first venting part channel extending from the water collection space through the function carrier and communicatingly connected to an air discharge channel extending in the function carrier; and
   a second venting part channel extending through an upper end disc of the ring filter element and communicatingly connected to the air discharge channel;
   wherein the air discharge channel is disposed downstream of the first venting part channel and the second venting part channel.

2. The fuel filter according to claim 1, further comprising at least one of:
   a first choke disposed between the first venting part channel and the air discharge channel; and
   a second choke disposed between the second venting part channel and the air discharge channel.

3. The fuel filter according to the claim 1, wherein:
   the ring filter element further includes i) a connector projecting from the upper end disc and ii) an extension projecting from the connector;
   the extension includes a first choke disposed between the first venting part channel and the air discharge channel;
   the connector defines at least a portion of the second venting part channel and includes a second choke disposed between the second venting part channel and the air discharge channel; and
   the connector, the extension, the first choke, and the second choke are integrally provided as a single piece with the upper end disc.

4. The fuel filter according to claim 1, further comprising:
   a first choke disposed between the first venting part channel and the air discharge channel; and
   a second choke disposed between the second venting part channel and the air discharge channel;
   wherein at least one of:
      the first choke is inserted into the first venting part channel and sealingly contacted via a first ring seal disposed in the first venting part channel; and
      the second choke is inserted into the function carrier and sealingly contacted via a second ring seal disposed in the air discharge channel.

5. The fuel filter according to claim 3, further comprising a first ring seal arranged on the extension and a second ring seal arranged on the connector, wherein:
   the first choke and the first ring seal are arranged in the first venting part channel;
   the second choke and the second ring seal are arranged in the function carrier; and
   the first ring seal has a smaller diameter than the second ring seal.

6. The fuel filter according to claim 2, wherein:
   the first venting part channel is at least partially disposed within and defined by a venting part;
   the first choke is formed as a separate component and inserted into the first venting part channel; and a first ring seal is arranged between and sealingly contacts the first choke and the venting part.

7. The fuel filter according to claim 1, wherein the air discharge channel is arranged parallel to the first venting part channel.

8. The fuel filter according to claim 1, wherein the first venting part channel and the second venting part channel are arranged coaxially to one another.

9. The fuel filter according to claim 1, further comprising at least one of a perforated cover and a screen arranged at an inlet of the second venting part channel.

10. The ring filter element for the fuel filter according to claim 1, comprising the second venting part channel.

11. The ring filter element according to claim 10, further comprising at least one of a first choke disposed at a lower free end of the second venting part channel and a second choke.

12. The ring filter element according to claim 11, wherein the second venting part channel and at least one of the first choke and the second choke are provided as a single integral piece with the upper end disc.

13. A fuel filter for an internal combustion engine, comprising:
a filter housing;
a ring filter element arranged in the filter housing and through which a fluid is flowable in a radial direction from a raw side to a clean side, the ring filter element including an end disc, a common space, and an opening;
a function carrier arranged at least partially in an interior space of the ring filter element;
a clean channel extending in the function carrier;
an air discharge channel extending in the function carrier;
a water collection space arranged below the ring filter element;
a first venting part channel extending from the water collection space through the function carrier and communicatingly connected to the air discharge channel; and
a second venting part channel extending through the end disc and communicatingly connected to the air discharge channel; and
wherein the first venting part channel and the second venting part channel each open into the common space of the ring filter element, and the common space is in fluid communication with the air discharge channel via the opening.

14. The fuel filter according to claim 13, wherein a central axis of the opening extends transversely to an axial direction of the ring filter element.

15. The fuel filter according to claim 13, wherein:
the ring filter element further includes a connector protruding from the end disc in an axial direction and an extension projecting from the connector in the axial direction; and
the common space and the opening are each disposed axially between at least a portion of the connector and at least a portion of the extension.

16. A fuel filter for an internal combustion engine, comprising:
a filter housing;
a ring filter element arranged in the filter housing and through which a fluid is flowable in a radial direction from a raw side to a clean side, the ring filter element including an end disc, a connector protruding from the end disc in an axial direction, and an extension projecting from the connector in the axial direction;
a function carrier arranged at least partially in an interior space of the ring filter element;
a clean channel extending in the function carrier;
an air discharge channel extending in the function carrier;
a water collection space arranged below the ring filter element;
a first venting part channel extending from the water collection space through the function carrier and communicatingly connected to the air discharge channel; and
a second venting part channel extending through the end disc and communicatingly connected to the air discharge channel;
wherein the first venting part channel is at least partially disposed within and defined by a venting part;
wherein the second venting part channel is at least partially disposed within and defined by the connector; and
wherein the extension protrudes into the first venting part channel and engages the venting part.

17. The fuel filter according to claim 16, wherein:
the extension includes a first choke disposed between the first venting part channel and the air discharge channel; and
the connector includes a second choke disposed between the second venting part channel and the air discharge channel.

18. The fuel filter according to claim 16, wherein the ring filter element further includes an opening via which both the first venting part channel and the second venting part channel are in fluid communication with the air discharge channel.

19. The fuel filter according to claim 16, further comprising:
a first ring seal arranged on the extension, the first ring seal disposed within the first venting part channel and abutting an inner circumferential surface of the venting part; and
a second ring seal arranged on the connector, the second ring seal abutting an air discharge channel body that at least partially defines the air discharge channel.

20. The fuel filter according to claim 16, wherein the connector and the extension are each at least partially disposed within the function carrier.

* * * * *